(12) United States Patent
Knight et al.

(10) Patent No.: US 9,634,457 B2
(45) Date of Patent: *Apr. 25, 2017

(54) EXTENDED SPECTRUM SUPERCONTINUUM PULSE SOURCE

(71) Applicant: Fianium Ltd., Southampton (GB)

(72) Inventors: Jonathan Cave Knight, Bath (GB); Dmitry Vladimirovich Skryabin, Bath (GB); James Morgan Stone, Bath (GB)

(73) Assignee: NKT Photonics A/S, Birkerød (DK)

( * ) Notice: Subject to any disclaimer, the term of this patent is extended or adjusted under 35 U.S.C. 154(b) by 0 days.

This patent is subject to a terminal disclaimer.

(21) Appl. No.: 14/968,863

(22) Filed: Dec. 14, 2015

(65) Prior Publication Data

US 2016/0268758 A1  Sep. 15, 2016

Related U.S. Application Data

(63) Continuation of application No. 13/908,357, filed on Jun. 3, 2013, now Pat. No. 9,217,824, which is a
(Continued)

(30) Foreign Application Priority Data

Feb. 8, 2008 (GB) .................... 0802356.6

(51) Int. Cl.
*H01S 3/067* (2006.01)
*G02B 6/02* (2006.01)
(Continued)

(52) U.S. Cl.
CPC ............ *H01S 3/06741* (2013.01); *G02B 6/02* (2013.01); *G02B 6/02214* (2013.01);
(Continued)

(58) Field of Classification Search
CPC .. G02B 6/02; G02B 6/02347; G02B 6/02214; G02F 1/365; G02F 2001/3528;
(Continued)

(56) References Cited

U.S. PATENT DOCUMENTS 6,052,393 A   4/2000   Islam
6,097,870 A   8/2000   Ranka et al.
(Continued)

FOREIGN PATENT DOCUMENTS

WO   WO2005/062113 A1   7/2005
WO   2005071483 A1   8/2005
(Continued)

OTHER PUBLICATIONS

Roy A et al.: "Double-clad non-linear microstructured fiber for white laser applications", Lasers and Electro-Optics and 2006 Quantum Electronics and Laser Science Conference. CLEO/QELS 2006. Conference on, IEEE, Piscataway, NJ, USA, May 21, 2006 (May 21, 2006), pp. 1-2. Submitted in IDS Mar. 24, 2011, U.S. Appl. No. 12/866,738.
(Continued)

*Primary Examiner* — Xinning Niu
(74) *Attorney, Agent, or Firm* — Peter Rainville

(57) ABSTRACT

A source of optical supercontinuum radiation comprises a length of microstructured optical fiber and a pump laser adapted to generate lasing radiation at a pump wavelength. The length of microstructured optical fiber is arranged to receive lasing radiation at the pump wavelength to generate optical supercontinuum radiation and comprises a core region and a cladding region which surrounds the core region. The source of optical supercontinuum radiation is arranged such that at a location along the length of the microstructured optical fiber (a) the microstructured optical fiber comprises a group index (GI) versus wavelength curve
(Continued)

having a zero crossing wavelength (ZCW) at which the group velocity dispersion has a zero crossing and such that the GI increases for wavelengths away from the ZCW such that the curve includes group indices that are greater than the GI at the ZCW for wavelengths greater than as well as less than the ZCW; (b) light having a wavelength of greater than 2000 nm propagates along the length of microstructured optical fiber and has a GI that is matched to the GI of light that propagates along the length of microstructured optical fiber and that has a wavelength of less than 400 nm; and (c) the pump wavelength is within 200 nm of the ZCW.

18 Claims, 7 Drawing Sheets

Related U.S. Application Data continuation of application No. 12/866,738, filed as application No. PCT/GB2009/050122 on Feb. 6, 2009, now Pat. No. 8,467,422.

(51) Int. Cl.
| | | |
|---|---|---|
| G02F 1/365 | (2006.01) | |
| H01S 3/08 | (2006.01) | |
| H01S 3/094 | (2006.01) | |
| G02F 1/35 | (2006.01) | |

(52) U.S. Cl.
CPC ......... *G02B 6/02347* (2013.01); *G02F 1/365* (2013.01); *H01S 3/08086* (2013.01); *H01S 3/094003* (2013.01); *G02F 2001/3528* (2013.01); *G02F 2202/32* (2013.01)

(58) Field of Classification Search
CPC ............. G02F 2002/32; G02F 2202/32; H01S 3/06741; H01S 3/094003; H01S 3/08086
See application file for complete search history.

(56) References Cited

U.S. PATENT DOCUMENTS

| | | | |
|---|---|---|---|
| 7,171,091 B1 | 1/2007 | Ward | |
| 8,422,519 B2 | 4/2013 | Knight et al. | |
| 8,467,422 B2* | 6/2013 | Knight ............... | G02B 6/02347 372/6 |
| 9,217,824 B2 | 12/2015 | Knight et al. | |
| 2003/0049003 A1 | 3/2003 | Ahmad et al. | |
| 2003/0156605 A1 | 8/2003 | Richardson et al. | |
| 2003/0215199 A1 | 11/2003 | Aitken | |
| 2004/0005153 A1 | 1/2004 | Watanabe | |
| 2004/0057682 A1 | 3/2004 | Nicholson et al. | |
| 2005/0226575 A1 | 10/2005 | Brown et al. | |
| 2005/0226576 A1 | 10/2005 | Feder et al. | |

FOREIGN PATENT DOCUMENTS

| | | |
|---|---|---|
| WO | WO2006/066093 A2 | 6/2006 |
| WO | WO2007/006316 A2 | 1/2007 |
| WO | WO2007/079750 A1 | 7/2007 |
| WO | WO2008/067823 A1 | 6/2008 |
| WO | 2010115432 A1 | 10/2010 |

OTHER PUBLICATIONS

Champert P-A et al: "White-light supercontinuum generation in normally dispersive optical fiber using original multi-wavelength pumping system" Optics Express, Optical Society of America, Washington, DC, US, vol. 12, No. 19, Sep. 20, 2004 (Sep. 20, 2004) pp. 466-4371, XP 002327132 ISSN: 1094-4087. Submitted in IDS Mar. 24, 2011, U.S. Appl. No. 12/866,738.
A. Kudlinski et al. "Zero-dispersion wavelength decreasing photonic crystal fibers for ultravioletextended supercontinuum generation" Jun. 12, 2006 Optics Express, vol. 14, No. 12, pp. 5715-5722. Submitted in IDS Mar. 24, 2011, U.S. Appl. No. 12/866,738. Specification of the Ando-AQ-6315B spectral analyser. Submitted in parent IDS Sep. 20, 2014, U.S. Appl. No. 13/908,357.
P. Leproux et al. "Generation de supercontinuum dans les fibres optiques microstructurees air-silice: potentialites pour l' emission UV coherente", J.Phys. IV France 138 (2006), pp. 141-151. Submitted in parent IDS Sep. 20, 2014, U.S. Appl. No. 13/908,357.
V. Tombelaine et al. "Ultra wide band supercontinuum generation in air-silica holey fibers by SHGinduced modulation instabilities", Optics Express, vol. 13, No. 19, Sep. 19, 2005, pp. 7399-7404. Submitted in parent IDS Sep. 20, 2014, U.S. Appl. No. 13/908,357.
J.C. Travers et al. "Multi-Watt Supercontinuum Generation from 0.3 to 2.4 μm in PCF tapers", Optical Society of America, 2007, OSA/CLEO 2007. Submitted in parent IDS Sep. 20, 2014, U.S. Appl. No. 13/908,357.
P. Beaud et al. "Ultrashort Pulse Propagation, Pulse Breakup, and Fundamental Soliton Formation in a Single-Mode Optical Fiber", IEEE Journal of Quantum Electronics, vol. QE-23, No. 11, Nov. 1987. Submitted in parent IDS Sep. 20, 2014, U.S. Appl. No. 13/908,357.
A.V. Gorbach et al. "Light trapping in gravity-like potentials and expansion of supercontinuum spectra in photonic-crystal fibres", Nature Photonics, vol. 1, Nov. 2007, pp. 653-657. Submitted in IDS Mar. 24, 2011, U.S. Appl. No. 12/866,738.
Response from the representative of the patentee, Chapman Molony, filed Oct. 25, 2010. Submitted in parent IDS Sep. 20, 2014, U.S. Appl. No. 13/908,357.
Opposition to European Patent No. 2250529B1 filed in European Patent Office by NKT Photonics A/S on Mar. 4, 2014. Submitted in parent IDS Sep. 20, 2014, U.S. Appl. No. 13/908,357.
Annex A attached to Opposition to European Patent No. 2250529B1 filed in European Patent Office by NKT Photonics A/S on Mar. 4, 2014. Submitted in parent IDS Sep. 20, 2014, U.S. Appl. No. 13/908,357.
Gorbach et al. Four-wave mixing of solitons with radiation and quasi non-dispersive wave packets at shortwavelength edge of a supercontinuum, Optics Express, Oct. 16, 2006. Submitted in IDS Mar. 24, 2011, U.S. Appl. No. 12/866,738.
Gorbach et al. "Theory of radiation trapping by the accelerating solitons in optical fibers", Physical Review A, 76, Nov. 5, 2007. Submitted in IDS Mar. 24, 2011, U.S. Appl. No. 12/866,738.
Nishizawa et al. "Characteristics of pulse trapping by use of ultrashort soliton pulses in optical fibers across the zerodispersion wavelength". Optics Express Oct. 21, 2002. Submitted in IDS Mar. 24, 2011, U.S. Appl. No. 12/866,738.
Ranka et al. "Efficient visible continuum generation in air-silica microstructure optical fibers with anomalous dispersion at 800 nm" Paper CPD8/1-CPD8/2, 1999. Submitted in IDS Mar. 24, 2011, U.S. Appl. No. 12/866,738.
Ranka et al. "Visible continuum generation in air-silica microstructure optical fibers with anomalous dispersion at 800 nm", Optics Letters, Jan. 1, 2000. Submitted in IDS Mar. 24, 2011, U.S. Appl. No. 12/866,738.
Tombelaine et al. "Visible supercontinuum generation in holey fibers by dual-wavelength subnanosecond pumping", IEEE Photonics Technology Letters, Dec. 1, 2006. Submitted in IDS Mar. 24, 2011, U.S. Appl. No. 12/866,738.
Wadsworth et al. "Supercontinuum and four-wave mixing with Q-switched pulses in endlessly single-mode photonic crystal fibers", Optics Express, Jan. 26, 2004. Submitted in IDS Mar. 24, 2011, U.S. Appl. No. 12/866,738.
Lesvigne, C. et al. Visible supercontinuum generation controlled by intermodal four-wave mixing in microstructured fiber, Optics Letters, vol. 32, No. 15, Aug. 1, 2007. Submitted in IDS Mar. 24, 2011, U.S. Appl. No. 12/866,738.

(56) References Cited

OTHER PUBLICATIONS

International Search Report and Written Opinion, PCT/GB2009/050122, May 19, 2009. Submitted in IDS Mar. 24, 2011, U.S. Appl. No. 12/866,738.
Great Britain Search Report, GB0802356.6, Jun. 6, 2008. Submitted in IDS Mar. 24, 2011, U.S. Appl. No. 12/866,738.
Zheltikov, A. "Nanoscale nonlinear optics in photonic crystal fibres", J. Opt. A Pure Appl. Opt. 8 (2006) S47-S72. Submitted in IDS Mar. 24, 2011, U.S. Appl. No. 12/866,738.
Price, J.H.V., et al. "Soliton transmission and supercontinuum generation in holey fiber, using a diode pumped Ytterbium fiber source", Optics Express, Apr. 22, 2002. Submitted in IDS Mar. 24, 2011, U.S. Appl. No. 12/866,738.
Written Submission of Third Party Observation Under Article 115 EPC with relevance to EP 09708041, Feb. 21, 2013. Submitted in IDS Apr. 14, 2013, U.S. Appl. No. 12/866,738.
EPO Acknowledge Receipt of Third Party Observation, Mar. 1, 2013. Submitted in IDS Apr. 14, 2013, U.S. Appl. No. 12/866,738.
EPO Communication of Intention to Grant Regarding EP 09708041, Mar. 13, 2013. Submitted in IDS Apr. 14, 2013, U.S. Appl. No. 12/866,738.
Text of EP 09708041 Accompanying EPO Communication of Intention to Grant , Mar. 13, 2013. Submitted in IDS Apr. 14, 2013, U.S. Appl. No. 12/866,738.
Letter From Third Party Regarding the Intention to Grant, Hegner & Partners A/S, Mar. 14, 2013. Submitted in IDS Apr. 14, 2013, U.S. Appl. No. 12/866,738.
Ando, Operation Manual "Optical Spectrum Analyzer AQ-6315A/-6315B". Submitted in IDS Apr. 14, 2013, U.S. Appl. No. 12/866,738.
EPO Form 2006 Regarding 3rd Party Submission, Mar. 26, 2013. Submitted in IDS Apr. 14, 2013, U.S. Appl. No. 12/866,738.
Response after Non-Final Office Action filed Nov. 26, 2012 for U.S. Pat. No. 8,467,422. Submitted in parent IDS Jul. 29, 2015, U.S. Appl. No. 13/908,357.
Response after Final Office Action tiled Apr. 14, 2013, for U.S. Pat. No. 8,467,422. Submitted in parent IDS Jul. 29, 2015, U.S. Appl. No. 13/908,357.
Response to Election/ Restriction Requirement filed Feb. 28, 2012 for U.S. Pat. No. 8,422,519. Submitted in parent IDS Jul. 29, 2015, U.S. Appl. No. 13/908,357.
Response after Final Office Action filed Nov. 15, 2012 for U.S. Pat. No. 8,422,519. Submitted in parent IDS Jul. 29, 2015, U.S. Appl. No. 13/908,357.
Amendment made by the Applicant for European Patent 2250529 on Oct. 26, 2010. Submitted in parent IDS Jul. 29, 2015, U.S. Appl. No. 13/908,357.
Amendment made by the Applicant for European Patent 2250529 on Dec. 17, 2012. Submitted in parent IDS Jul. 29, 2015, U.S. Appl. No. 13/908,357.
Nicholson J W et Al: "Visible continuum generation using a femtosecond erbium-doped fiber laser and a silica nonlinear fiber", Optics Letters, OSA, Optical Society of America, Washington, DC, US, vol. 33, No. I, Jan. 1, 2008 (Jan. 1, 2008), pp. 28-30, XP001510517, ISSN: 0146-9592, DOI: 10.1364/0L.33.000028. Submitted in parent IDS Jul. 29, 2015, U.S. Appl. No. 13/908,357.
Nguyen Hoang Hai et al: "An unique design of ultra-flattened dispersion photonic crystal fibers", Microwave and Optoelectronics Conference, 2007. !MOC 2007. SBMO/IEEE M TT-S International, IEEE, PI, Oct. 29, 2007 (Oct. 29, 2007), pp. 46-49, XP031223324, ISBN: 978-1-4244-0660-9. Submitted in parent IDS Jul. 29, 2015, U.S. Appl. No. 13/908,357.
Ming-Leung V Tse et al: "Designing Tapered Holey Fibers for Soliton Compression", IEEE Journal of Quantum Electronics, IEEE Service Center, Piscataway, NJ, USA, vol. 44, No. 2, Feb. 1, 2008 (Feb. 1, 2008), pp. 192-198, XP011199540, ISSN: 0018-9197, DOI: 10.1109/JQE.2007.910446. Submitted in parent IDS Jul. 29, 2015, U.S. Appl. No. 13/908,357.
Written Opinion EP2597513, Jun. 4, 2013. Submitted in parent IDS Jul. 27, 2015, U.S. Appl. No. 13/908,357.
Search Report EP2597513, Jun. 4, 2013. Submitted in parent IDS Jul. 27, 2015, U.S. Appl. No. 13/908,357.
Reply Rule 70(2) and 70a(2) EP2597513 by the Applicant, Nov. 27, 2013. Submitted in parent IDS Jul. 27, 2015, U.S. Appl. No. 13/908,357.
First Examination Report of EP2597513 issued by the EPO, Jan. 10, 2014. Submitted in parent IDS Jul. 27, 2015, U.S. Appl. No. 13/908,357.
Response to Examination Report of EP2597513 by the Applicant, filed on Jul. 26, 2014. Submitted in parent IDS Jul. 27, 2015, U.S. Appl. No. 13/908,357.
Intention to Grant EP2597513, Sep. 30, 2014. Submitted in parent IDS Jul. 27, 2015, U.S. Appl. No. 13/908,357.
Reply to Intention to Grant, EP2597513, Feb. 10, 2015. Submitted in parent IDS Jul. 27, 2015, U.S. Appl. No. 13/908,357.
Second Intention to Grant, EP2597513, Mar. 6, 2015. Submitted in parent IDS Jul. 27, 2015, U.S. Appl. No. 13/908,357.
Reply to Counterstatement of EP2250529 by NKT, Apr. 8, 2015. Submitted in parent IDS Jul. 27, 2015, U.S. Appl. No. 13/908,357.
Counterstatement to Opposition of EP2250529 by the Applicant, Nov. 27, 2014. Submitted in parent IDS Jul. 27, 2015, U.S. Appl. No. 13/908,357.
Nagashima, T., Hasegawa, T., Ohara, S., Sugimoto, N., Kikuchi, K.; Multi-step-index Bismuth-based highly nonlinear fiber with low propagation loss and splicing loss; Optical Fiber Communication Conference and Exposition and The National Fiber Optic Engineers Conference, Technical Digest (CD) (Optical Society of America, 2005), paper OThA2.
J. M. Stone and J. C. Knight, "Visibly "white" light generation in uniform photonic crystal fiber using a microchip laser," Opt. Express 16, 2670-2675 (2008).
J.C. Travers; Blue Extension of Optical Fibre Supercontinuum Generation; Journal of Optics, Oct. 29, 2010, vol. 12, No. 11, IOP Publishing Ltd.
Dudley, John M.; Genty, Goëry; Coen, Stéphane; Supercontinuum generation in photonic crystal fiber; Oct. 2006, Reviews of Modern Physics, vol. 78, Issue 4, pp. 1135-1184.
Clowes, John; Next Generation Light Sources for Imaging; Mar. 2008, Optik & Photonik, vol. 3, Issue 1, pp. 36-38.
EPO Communication Re: Cancelled Oral Proceedings, European Application No. 09708041.0 (European Patent No. 1903/2250529), Apr. 14, 2016.
EPO Communication to Discontinue Oral Proceedings, European Application No. 09708041.0 (European Patent No. 1903/2250529), Apr. 14, 2016.
EPO Communication Re: NKT Withdrawal of Opposition, European Application No. 09708041.0 (European Patent No. 1903/2250529), Apr. 7, 2016.
EPO Summons to Oral Proceedings, European Application No. 09708041.0 (European Patent No. 1903/2250529), Dec. 14, 2015.

* cited by examiner

EXTENDED SPECTRUM SUPERCONTINUUM PULSE SOURCE

CROSS-REFERENCE TO RELATED APPLICATIONS

The present application is a continuation of U.S. application Ser. No. 13/908,357, filed Jun. 3, 2013 and entitled "Supercontinuum Pulse Source With Enhanced Spectrum", which further claims the priority to U.S. application Ser. No. 12/866,738 (now U.S. Pat. No. 8,467,422), filed Aug. 8, 2010 and entitled "A Source of Optical Supercontinuum Radiation. U.S. application Ser. No. 12/866,738 claims priority to International PCT Patent Application PCT/GB09/50122, bearing an international filing date of Feb. 6, 2009 and entitled "A Source of Optical Supercontinuum Radiation." PCT/GB09/50122 claims priority to UK Patent Application GB 0802356.6, filed Feb. 8, 2008. The foregoing applications are incorporated herein by reference.

FIELD OF THE INVENTION

The present invention relates to a source of optical supercontinuum radiation and more particularly, but not exclusively, to a supercontinuum pulse source with an enhanced spectrum.

BACKGROUND

Supercontinuum generation refers to the formation of broad continuous spectra by the propagation of a high power, relatively narrow spectral bandwidth laser radiation through a nonlinear medium. The continuum is produced via a number of nonlinear effects including self-phase modulation, Raman scattering and four-wave mixing. Initial experiments with supercontinuum generation used very high power lasers (mJ or µJ per pulse) with ultrashort pulses, typically <1 ps, focused into glass, sapphire and even water. The extremely high power of many megawatts was sufficient to create broad bandwidth spectra, typically spanning an octave or more (i.e. from a certain wavelength to twice that wavelength). However, the high power required meant that large, bulk laser systems were needed and often damaged the nonlinear media. In addition, the supercontinuum typically had an unstable and irregular transverse profile. The breakthrough was provided with the advent of specialised optical fibres providing high confinement within the core i.e. a high power density, which can propagate over long interaction lengths and therefore generate supercontinua at relatively lower laser powers and in a single transverse mode.

Optical fibres are commonly based on silica glass and in the spectral region beyond 1300 nm in which the material dispersion of silica glass is anomalous, optical fibres can be designed and fabricated to have a group velocity dispersion which is normal or anomalous, with a zero dispersion at any given wavelength over a wide range. It is not possible however, to move the zero dispersion wavelength of a conventional silica step-index, single-mode optical fibre to wavelengths less than 1270 nm, namely the zero dispersion wavelength of bulk silica.

The zero dispersion wavelength (ZDW) is an important parameter in the generation of supercontinua as, to-date, the widest spectra are produced when the pump wavelength, i.e. the laser wavelength that is coupled into the fibre, is close to the ZDW. In microstructured fibres or, more commonly, photonic crystal fibres (PCFs) however, it is possible to shift the ZDW of single mode fibres to much shorter wavelengths to thereby enable other laser sources having different wavelengths to be utilised as pump sources in the generation of supercontinua.

PCFs are most commonly formed from silica material and comprise a solid silica core region surrounded by a cladding region, which comprises an array of hexagonal-close-packed air filled holes in a silica background matrix. The air-silica cladding material creates an effective refractive index which is less than the refractive index of the core region and thus permits the guidance of light within the core by a variation of the traditional mechanism of total internal reflection.

PCFs are characterised largely by the diameter of the core, the ratio of the diameter (d) of the air holes in the cladding to their spacing, or pitch ($\Lambda$), and the ratio of the difference between the refractive index of the core and the effective refractive index of the cladding region, to the refractive index of the core, often referred to as "delta" or $\Delta$. PCFs can be manufactured to support a single confined mode (i.e. single mode fibre) or a plurality of confined modes (multimode fibre), respectively. More significantly, PCFs can also be manufactured to be endlessly single mode (ESM), such that ESM fibres can support only one mode for all wavelengths.

U.S. Pat. No. 6,097,870, hereinafter '870, and the corresponding scientific paper (Optics Letters, Vol. 25, No. 1, Jan. 1 2000—"*Visible Continuum Generation in Air-Silica Microstructure Optical Fibres with Anomalous Dispersion at 800 nm*"), discloses a microstructured optical fibre which is pumped at approximately 800 nm to generate optical supercontinuum in the range 390 nm-1600 nm. The fibre disclosed in '870 is inherently single mode at the pump wavelength which is the preference in the art given that single mode fibres have the best characteristics in terms of diffraction, transverse profile, stability and smallest spot size of the transmitted beam. Furthermore, single mode fibres do not exhibit modal dispersion, can carry more information than multimode fibres and are better at retaining the fidelity of each pulse over long distances. However, while the supercontinuum generated in the '870 patent spans from as low as 400 nm in the blue region to the infra-red region of the spectrum, the supercontinuum described in '870 can only be obtained using 800 nm pump wavelengths, and at this wavelength typical pump sources are unreliable and unfeasibly expensive for many applications.

There are two basic designs of PCF which have been used in the art for the generation of supercontinuum. One is the high-$\Delta$ fibre similar to that disclosed in the '870 patent. This type of fibre has the advantage of strong beam confinement giving a high nonlinear coefficient and a zero dispersion at short wavelengths.

The second type of fibre is the ESM fibre comprising relatively small diameter air holes in the cladding. This type of fibre can produce a zero dispersion wavelength around 1060 nm or 800 nm, but the nonlinear coefficient is not as strong. However, it has the advantage of being intrinsically single mode. The trend in the art is to use ESM fibres for pumping at wavelengths of 1060 nm.

It is an object of the present invention to provide a source of optical supercontinuum radiation for generating an optical supercontinuum having blue-enhanced spectral components.

SUMMARY

In accordance with the present invention there is provided a source of optical supercontinuum radiation, the source comprising a microstructured optical fibre and a pump laser adapted to generate lasing radiation at a pump wavelength, the microstructured optical fibre comprising a core region and a cladding region which surrounds the core region;

the fibre comprising a zero dispersion wavelength within ±200 nm of said pump wavelength, wherein the fibre can support a plurality of modes at said pump wavelength; and the pump laser is adapted to launch said lasing radiation at said pump wavelength into the core region of the microstructured optical fibre to excite the fundamental mode of the fibre.

The microstructured fibre of the present invention is thus not single mode at the pump wavelength. In contrast, the disclosure of '870 implies single mode at the pump wavelength.

The optical supercontinuum can be generated in substantially the fundamental mode of the fibre.

The microstructured optical fibre modifies the group index dispersion at infra-red wavelengths such that the group index at these wavelengths is identical to that at blue and ultraviolet wavelengths of less than 390 nm and thereby provides for an enhanced blue generation in the supercontinuum.

Preferably, the ZDW of the fibre is less than 1000 nm.

It is preferred that the pump wavelength is separated from the ZDW of the fibre by at least 10 nm and more preferably by at least 20 nm. Offsetting the pump wavelength from the ZDW of the fibre in this way maximises the bandwidth of the supercontinuum.

The core region of the microstructured fibre preferably comprises a first refractive index and the cladding region comprises a second effective refractive index such that the Δ-value is greater than 0.03.

The microstructured optical fibre preferably comprises a core of substantially circular cross-section having a diameter in the range 1-5 µm. The cladding region preferably comprises at least two capillary air holes having substantially the same diameter and which extend substantially along the length of the fibre. Preferably, the ratio of the diameter of said air holes to their separation is greater than 0.6. The microstructured fibre is preferably formed substantially of silica.

The pump laser may comprise a mode-locked laser, a Q-switched laser, a gain-switched laser, or a master oscillator power amplifier. The pump laser preferably comprises a fibre laser. The pump wavelength is preferably in the range 900 nm to 1200 nm, most preferably in the range 1000 nm to 1100 nm, and is desirably in the range 1050 nm to 1070 nm. The pump laser most preferably comprises a mode locked fibre laser operating at substantially 1064 nm. The pump laser may be arranged to generate linearly polarised lasing radiation.

Preferably, the fibre exhibits anomalous dispersion at the pump wavelength.

The specific processes involved in the generation of the supercontinuum of the present invention are strongly influenced by the variation of the group index across the transparency window of the PCF. The variation of the group index with wavelength generally takes the form of a skewed "U", with rapidly decreasing group index (normal group-velocity dispersion) moving from shorter wavelengths, a zero-crossing in the group velocity dispersion (GVD) typically around the pump wavelength at 1060 nm, and increasing group index (anomalous dispersion) towards longer wavelengths. The microstructured optical fibre of the source of optical supercontinuum radiation of the present invention has a variation of group index with wavelength in which the "U" rises more steeply on the short wavelength side than at longer wavelengths, because of the strong material dispersion of silica at these shorter wavelengths. A frequency-shifting soliton propagating in the anomalous-dispersion (infra-red) regime effectively traps blue radiation propagating with the same group index on the other arm of the "U" in a potential well and scatters the blue radiation to shorter wavelengths in a cascaded four-wave mixing process.

The microstructured optical fibre preferably has a group index curve adapted to match the group index at wavelengths of greater than 2000 nm to the corresponding group index at a wavelength of less than 400 nm.

The long and short wavelength side of the group index dispersion, namely the extent of the supercontinuum, is limited by the very rapidly rising absorption of the material as one moves beyond 2.5 µm, which is typically exacerbated in PCF's by the presence of OH— ions which have an absorption band at around 2.4 µm. The group index variation of the microstructured optical fibre of the source of optical supercontinuum radiation of the present invention enables shorter blue wavelengths to be accessed due to the higher rate of change of group index with wavelength in the infra-red wavelength region.

BRIEF DESCRIPTION OF THE DRAWINGS

Embodiments of the present invention will now be described by way of example only and with reference to the accompanying drawings, in which.

DETAILED DESCRIPTION

Figure 1:
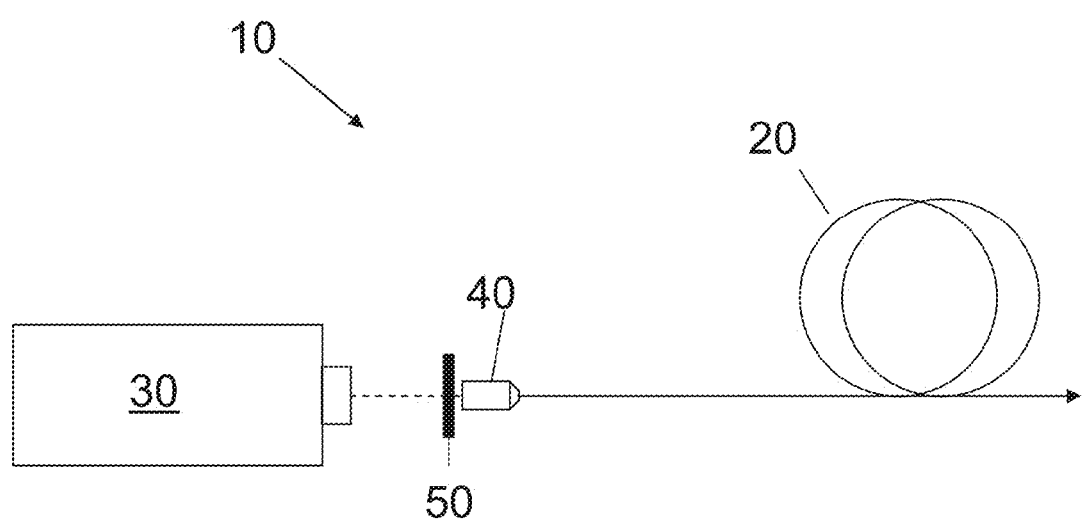
FIG. 1 is a schematic representation of a source of optical supercontinuum radiation according to a first embodiment of the of the present invention.
Figure 2:
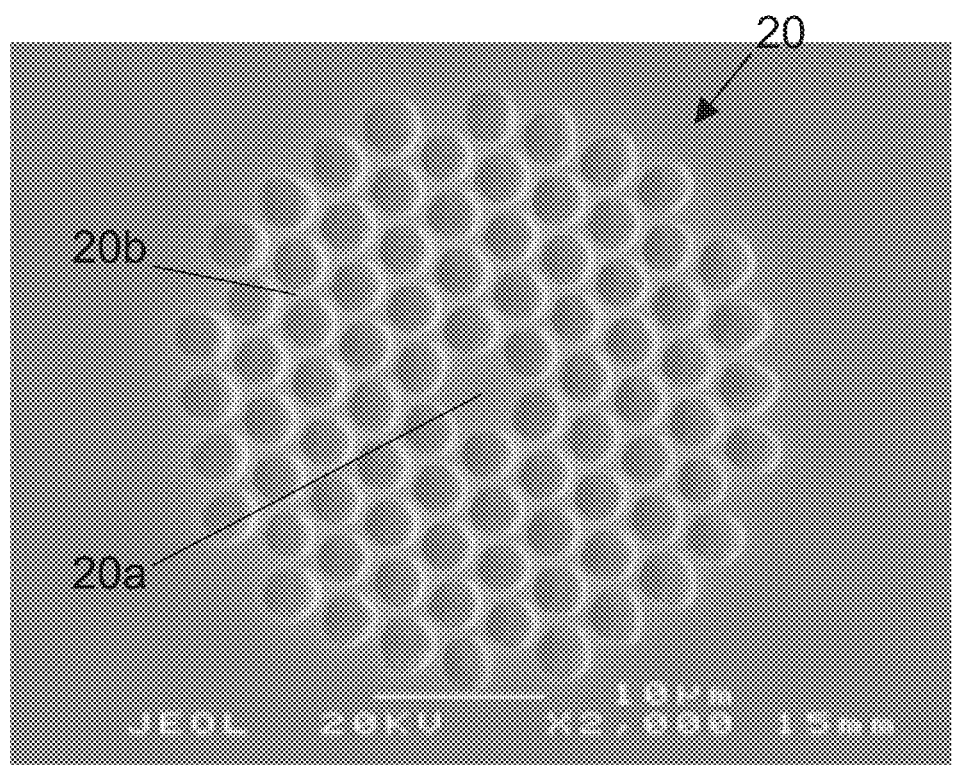
FIG. 2 is a scanning electron micrograph image of a cross-section of the large core, high-Δ fibre of the source of optical supercontinuum of FIG. 1.

Referring to FIG. 1 of the drawings and in accordance with a first embodiment of the present invention, the source of optical supercontinuum radiation 10 comprises a microstructured optical fibre 20, fabricated using the stack and draw method, and a pump laser 30. The microstructured optical fibre 20 comprises a core substantially 4.7 µm in diameter and a large index contrast (Δ~0.03) between the core 20a and cladding regions 20b. The pitch was measured to be substantially 3.7 μm and the ratio d/Λ was measured to be substantially 0.77. An SEM image of a cross-section of the fibre 20 is shown in FIG. 2.

The pump laser 30 is a Q-switched microchip laser 30 operable to generate infrared lasing pulses of 600 ps to 1 ns duration at a 10 kHz repetition rate, and centred at 1064 nm, which were coupled into the core 20a of a 10 m length of the fibre 20 via an objective lens 40, and the input power of the pump laser was varied by means of a neutral density (ND) filter wheel 50 that was placed in front of the fibre input, as shown in FIG. 1. The output power was measured using a power meter (not shown). The polarisation state of the coupled laser beam can be controlled by means of additional polarisation elements (not shown).

Figure 3:
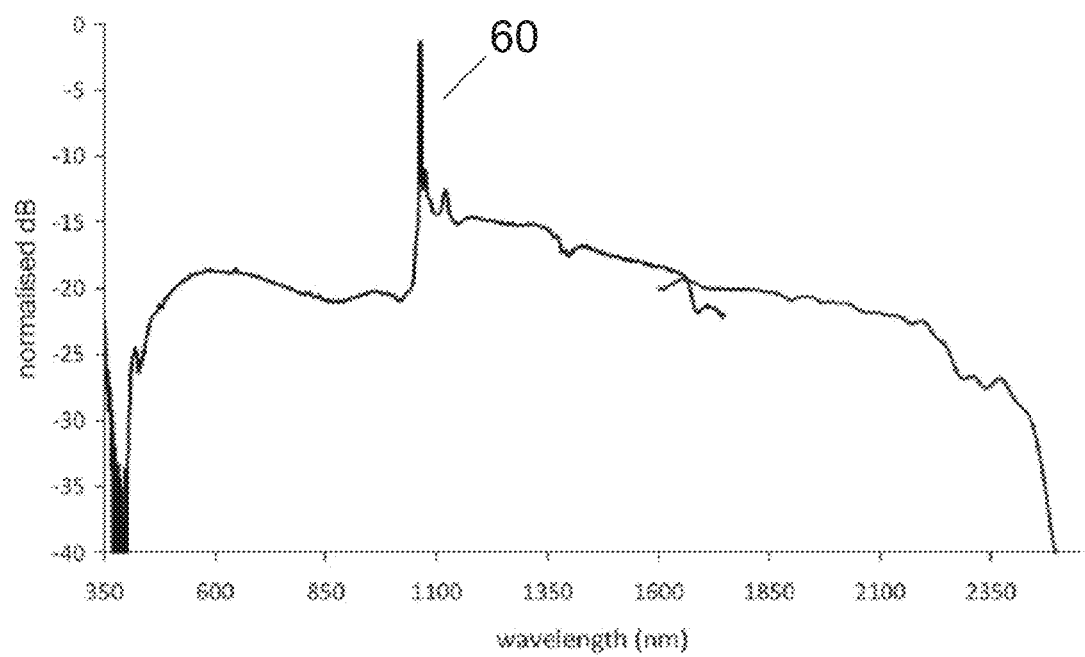
FIG. 3 is a graphical representation of the full spectrum output from the source of optical supercontinuum radiation of FIG. 1.

The fibre 20 is multimode at the pump wavelength, however, only the fundamental mode is excited in generating the supercontinuum. The generated supercontinuum is also almost exclusively in the fundamental mode. The short wavelength output (350-1750 nm) was collected by an extra fibre (not shown) and recorded on an optical spectrum analyser (not shown), while the long wavelength edge of the continuum (900-2550 nm) was collected in a short, straight length of single mode fibre (not shown) and recorded on an IR spectrometer (not shown). The pump peaks were filtered out using a long pass filter (cut-off wavelength 1600 nm) to prevent multi-order interference in the measurement. The full optical spectrum output from the high-Δ fibre 20 is shown in FIG. 3; the pump at 1064 nm is clearly visible as the peak 60.

Figure 4:
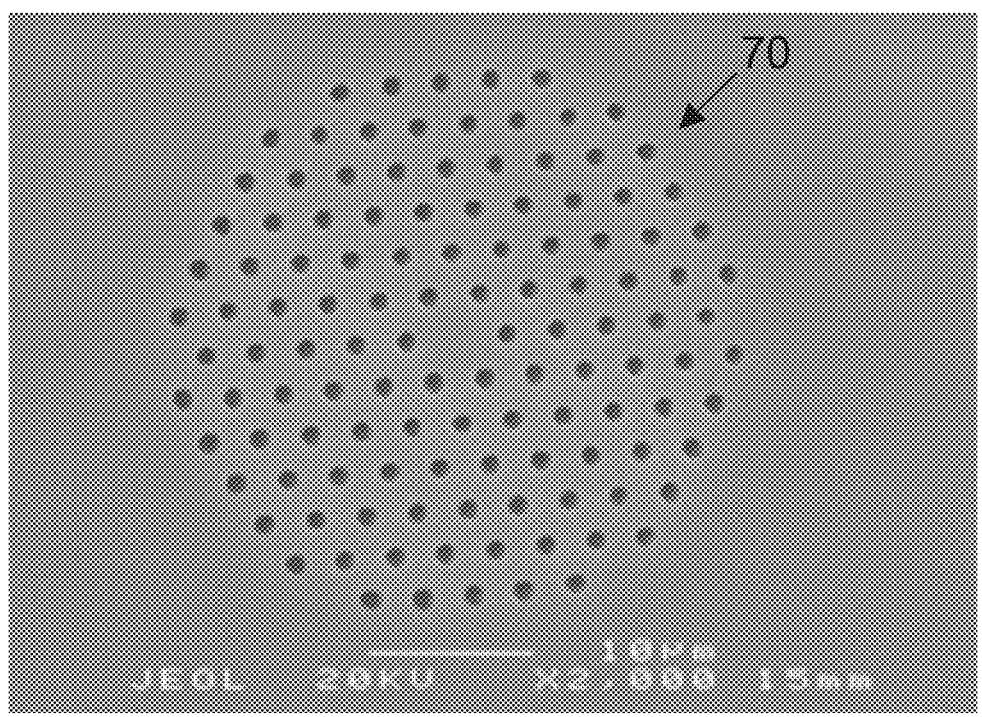
FIG. 4 is a scanning electron micrograph image of a cross-section of an ESM fibre.

In order to provide a suitable comparison of the data, the infrared lasing pulses were also coupled into a 10 m length of ESM (d/Λ=0.43, Λ=3.0 μm) fibre 70, and the output was recorded using the power meter (not shown) and the optical spectrum analyser (not shown). An SEM image of a cross-section of the ESM fibre 70 is shown in FIG. 4.

Figure 5:
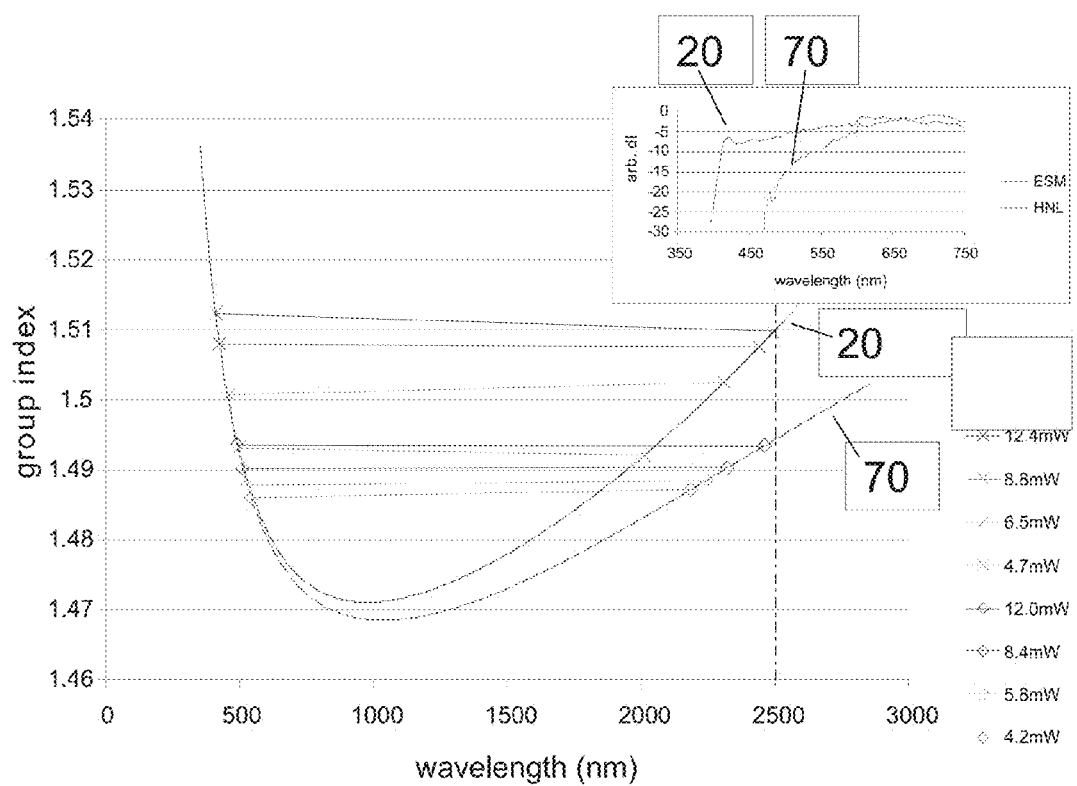
FIG. 5 is a graphical representation of the group index curves for the large core high-Δ fibre of FIG. 2 and the ESM fibre of FIG. 4, plotted as a function of wavelength (the insert shows the short wavelength edges of the supercontinuum generated from the high-Δ fibre and the ESM fibre)

Spectra were recorded for four different output powers using each fibre 20, 70 and the short and long wavelength edges identified, by selecting a point at a fixed value, 10, 15 or 20 dB less than a feature which appeared in all the spectra for either the long or short wavelength edges. The group index curves for the high-Δ fibre 20 and the ESM fibre 70 are plotted as functions of wavelength in FIG. 5.

It is evident that the high-Δ fibre 20 creates a broader continuum than the ESM fibre 70, and extends further into the blue region of the spectrum than the continuum generated from the ESM fibre 70. The agreement is good, that is, the lines joining the short and long wavelength edges are almost horizontal on the plot. This gives strong support to the concept of group-index matching between the longest and shortest wavelengths being a limiting factor in blue and ultraviolet supercontinuum generation.

Figure 6:
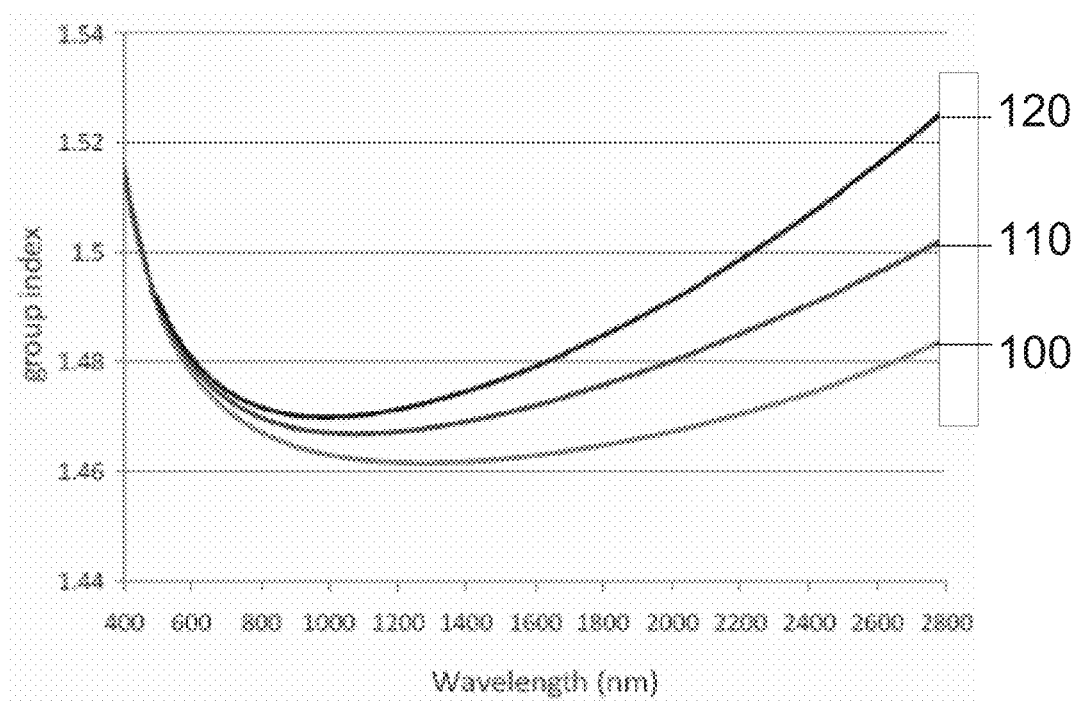
FIG. 6 is a graphical representation of the modelled variation of group index with wavelength, for bulk silica, an ESM PCF and for a strand of silica surrounded by air.

Comparing the group index of bulk silica 100 with the theoretical group index for an ESM PCF 110 and for a strand of silica 120 surrounded by air, as shown in FIG. 6, it is seen that although at short wavelengths the three curves are almost indistinguishable, the behaviour at long wavelengths is very different.

The waveguide dispersion causes a steeper increase in the group index (increasing the anomalous dispersion) which matches the index at a specific infrared wavelength to significantly shorter wavelengths in the ultraviolet. As this group-index matching is what is required for blue light generation, it is apparent that a strand of silica surrounded by air would generate shorter wavelengths than an ESM PCF.

The fibre 20 used in the source of optical supercontinuum radiation 10 of the present invention approximates a strand of silica surrounded by air.

The fibre group index curve can be modified to push the continuum further into the near ultraviolet, by reducing the core size. However, this also shifts the zero dispersion wavelength away from the pump.

According to a second embodiment of the invention, a series of three high-Δ fibres were drawn, the fibre 20 as described above and two identical fibres with different outer diameters and hence core sizes, which were measured to be ~4.4 μm 130 and ~4.2 μm 140 (the outer diameters of the three fibres 20, 130, 140 are 100 μm, 95 μm and 90 μm). Each of these fibres was separately used to generate supercontinuum in accordance with the arrangement illustrated in FIG. 1. The fibres 130, 140 are multimode at the pump wavelength as is fibre 20, and each fibre, 20, 130, 140 was pumped in an identical manner to that previously described with only the fundamental mode being excited in the individual fibres. The spectra output from each fibre were recorded directly on an optical spectrum analyser. The normalized short wavelength edges of the spectra for each fibre 20, 130, 140 and the modelled group index curves are shown in FIG. 7A and FIG. 7B, respectively.

Figure 7A:
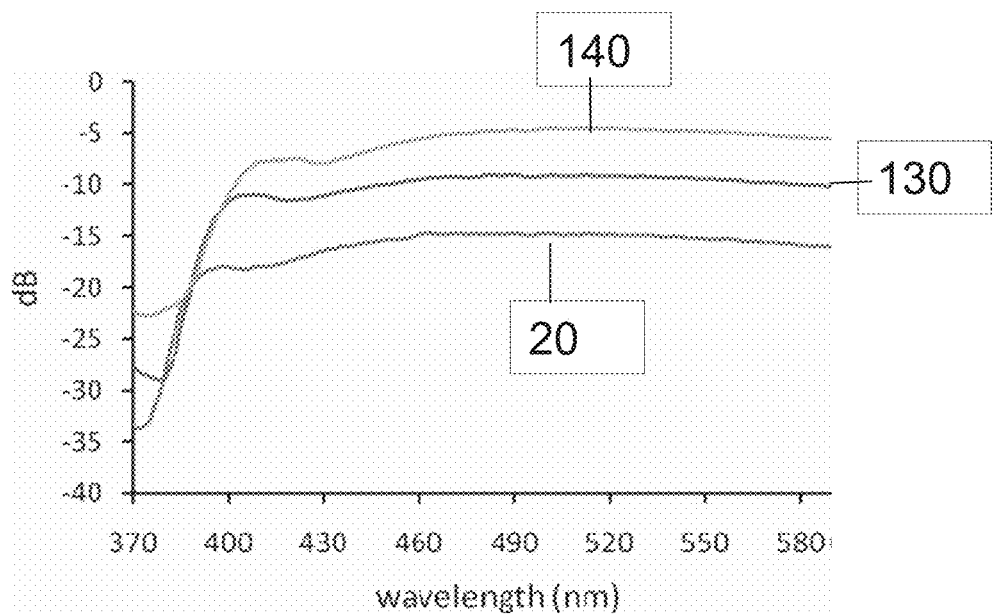
FIG. 7A is a graphical representation of short wavelength continuum edges for high-Δ fibres of a source of optical supercontinuum radiation in accordance with a second embodiment of the present invention, having core diameters of 4.7 µm, 4.4 µm and 4.2 µm.
Figure 7B:
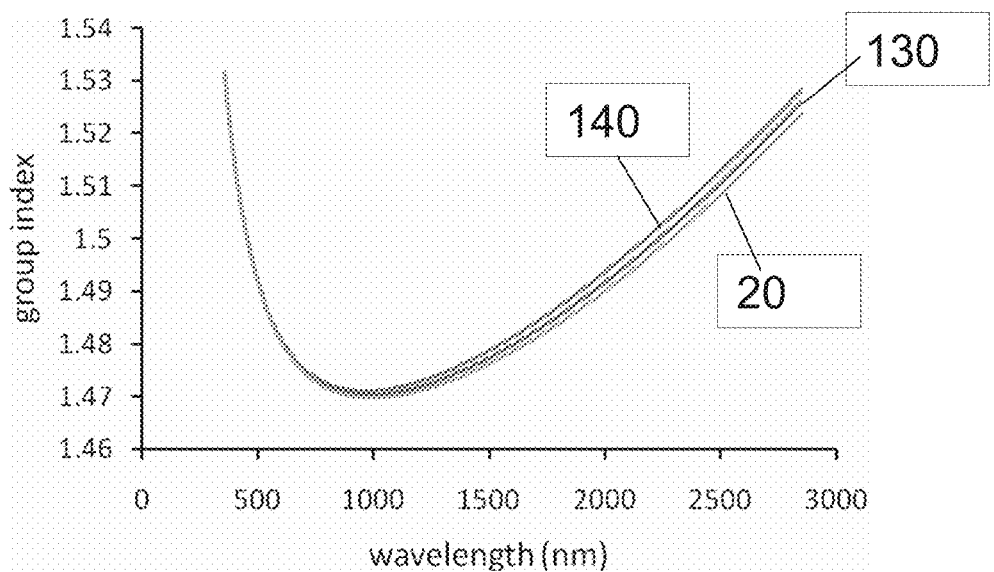
FIG. 7B is a graphical representation of modelled group index curves for high-Δ fibres of the source of optical supercontinuum radiation in accordance with the second embodiment of the present invention, having core diameters of 4.7 µm, 4.4 µm and 4.2 µm.

Referring to FIG. 7A and FIG. 7B, it is evident that the individual spectra do indeed extend to shorter wavelengths, namely less than 390 nm for the smaller cores. The primary mechanism for supercontinuum generation on the long wavelength side of the pump is Raman shifting solitons, which are unaffected by the proximity of the pump to the fibre zero dispersion point. On the short wavelength side of the pump however, new frequencies are initially generated by other processes such as four-wave mixing (prior to being shifted to deeper blue frequencies by group index matched solitons), which require the pump to be in close proximity to the zero dispersion wavelength of the fibre. As the fibre pitch is decreased to steepen the infrared edge of the group index curve the zero dispersion points are also shifted away from the pump thereby reducing the amount of new frequencies generated.

It will be appreciated that the pump laser may alternatively comprise a mode-locked fibre laser, a gain switched laser or a master oscillator power amplifier (MOPA).

The sources of optical supercontinuum radiation of the present invention enable the creation of a truly "white" light source by including the wavelength region 350-400 nm in the generated spectrum. The entire spectrum is generated in the fundamental mode of the fibre. The fibre design used, with large air holes to modify the group index profile of the fibre, enables the sources of optical supercontinuum described to group-index-match long-wavelength-edge (infrared) radiation to shorter wavelengths in the blue/ultraviolet than has previously been possible. The shorter wavelength band which is incorporated in the supercontinua generated by the sources described will allow new applications to be unlocked from compact supercontinuum sources.

The invention claimed is:

1. A source of optical supercontinuum radiation, the source comprising:
a length of microstructured optical fibre;
a pump laser adapted to generate lasing radiation at a pump wavelength;
said length of microstructured optical fibre arranged for receiving lasing radiation at the pump wavelength so as to generate optical supercontinuum radiation, said microstructured optical fibre comprising a core region and a cladding region which surrounds the core region;

wherein said source of optical supercontinuum radiation is arranged such that at a location along the length of microstructured optical fibre:
(a) said microstructured optical fibre comprises a group index (GI) versus wavelength curve having a zero crossing wavelength (ZCW) at which the group velocity dispersion has a zero crossing and such that the GI increases for wavelengths away from the ZCW such that the curve includes group indices that are greater than the GI at the ZCW for wavelengths greater than as well as less than the ZCW;
(b) light having a wavelength of greater than 2000 nm is propagating along the length of microstructured optical fibre and has a GI that is matched to the GI of light that is propagating along the length of microstructured optical fibre and that has a wavelength of less than 400 nm; and
(c) the pump wavelength is within 200 nm of the ZCW.

2. The source of optical supercontinuum radiation according to claim 1 wherein said pump laser is adapted to generate lasing radiation having a pump wavelength in the wavelength range of 900 nm to 1200 nm.

3. The source of optical supercontinuum radiation according to claim 1 wherein said core region has a substantially circular cross section.

4. The source of optical supercontinuum radiation according to claim 1 wherein said microstructured optical fibre is formed substantially of silica.

5. The source of optical supercontinuum radiation according to claim 1 wherein said pump laser comprises a mode-locked laser.

6. The source of optical supercontinuum radiation according to claim 1 wherein said cladding region comprises at least two capillary air holes having substantially the same diameter and which extend substantially along the length of the microstructured optical fibre.

7. The source of optical supercontinuum radiation according to claim 1 wherein said core region has a diameter in the range of 1 µm to 5 µm.

8. The source of optical supercontinuum radiation according to claim 1 wherein the optical supercontinuum radiation is generated in substantially the fundamental mode of the microstructured optical fibre.

9. The source of optical supercontinuum radiation according to claim 8 wherein the entire spectrum of the optical supercontinuum radiation is generated in the fundamental mode of the microstructured optical fibre.

10. A source of optical supercontinuum radiation, comprising:
a length of microstructured optical fibre;
a pump laser adapted to generate lasing radiation at a pump wavelength;
said microstructured optical fibre being configured for receiving said lasing radiation at the pump wavelength so as to generate the optical supercontinuum radiation, said microstructured optical fibre comprising a core region and a cladding region which surrounds the core region;
wherein said microstructured optical fibre is configured so as to have a group index (GI) versus wavelength curve having a zero crossing wavelength (ZCW) at which the group velocity dispersion has a zero crossing and such that the GI increases for wavelengths away from the ZCW such that the curve includes group indices that are greater than the GI at the ZCW for wavelengths greater than as well as less than the ZCW;
wherein the pump wavelength is within 200 nm of the ZCW; and
wherein said microstructured optical fibre is further configured such that the GI versus wavelength curve is such that the GI at a wavelength greater than 2000 nm is matched to the GI at a wavelength less than 400 nm.

11. The source of optical supercontinuum radiation according to claim 10 wherein said pump laser is adapted to generate lasing radiation having a pump wavelength in the wavelength range of 900 nm to 1200 nm.

12. The source of optical supercontinuum radiation according to claim 10 wherein said core region has a substantially circular cross section.

13. The source of optical supercontinuum radiation according to claim 10 wherein said microstructured optical fibre is formed substantially of silica.

14. The source of optical supercontinuum radiation according to claim 10 wherein said pump laser comprises a mode-locked laser.

15. The source of optical supercontinuum radiation according to claim 10 wherein said cladding region comprises at least two capillary air holes having substantially the same diameter and which extend substantially along the length of the microstructured optical fibre.

16. The source of optical supercontinuum radiation according to claim 10 wherein said core region has a diameter in the range of 1 µm to 5 µm.

17. The source of optical supercontinuum radiation according to claim 10 wherein the optical supercontinuum radiation is generated in substantially the fundamental mode of the microstructured optical fibre.

18. The source of optical supercontinuum radiation according to claim 17 wherein the entire spectrum of the optical supercontinuum radiation is generated in substantially the fundamental mode of the microstructured optical fibre.

* * * * *